United States Patent
Subramaniyan

(10) Patent No.: US 10,830,082 B2
(45) Date of Patent: Nov. 10, 2020

(54) SYSTEMS INCLUDING ROTOR BLADE TIPS AND CIRCUMFERENTIALLY GROOVED SHROUDS

(71) Applicant: General Electric Company, Schenectady, NY (US)

(72) Inventor: Moorthi Subramaniyan, Bangalore (IN)

(73) Assignee: General Electric Company, Schenectady, NY (US)

( * ) Notice: Subject to any disclaimer, the term of this patent is extended or adjusted under 35 U.S.C. 154(b) by 199 days.

(21) Appl. No.: 16/029,569

(22) Filed: Jul. 7, 2018

(65) Prior Publication Data

US 2018/0328212 A1    Nov. 15, 2018

Related U.S. Application Data

(63) Continuation of application No. 15/591,242, filed on May 10, 2017, now Pat. No. 10,443,405.

(51) Int. Cl.
*F01D 11/08* (2006.01)
*F01D 5/20* (2006.01)

(52) U.S. Cl.
CPC ............. *F01D 11/08* (2013.01); *F01D 5/20* (2013.01); *F05D 2220/31* (2013.01);
(Continued)

(58) Field of Classification Search
CPC ...... F01D 5/20; F01D 11/08; F05F 2250/182; F05F 2250/294; F05F 2240/14;
(Continued)

(56) References Cited

U.S. PATENT DOCUMENTS 4,466,772 A * 8/1984 Okapuu ................ F01D 11/08
                                                        415/171.1
4,714,406 A * 12/1987 Hough .................. F01D 11/08
                                                        415/173.1
(Continued)

FOREIGN PATENT DOCUMENTS

| EP | 1840332 A1 | 10/2007 |
| EP | 2093378 A1 | 8/2009 |
| EP | 2148042 A2 | 1/2010 |

OTHER PUBLICATIONS

Lomakin et al., Effect of Various Tip Clearance Squealer Design on Turbine Stage Efficiency, ASME. Turbo Expo 2015: Power for Land, Sea, and Air, vol. 2A: GT2015-4276, Jun. 15-19, 2015, Montreal CA.

*Primary Examiner* — J. Todd Newton
(74) *Attorney, Agent, or Firm* — Dority & Manning, P.A.

(57) ABSTRACT

A system for a turbomachine includes a rotor blade configured to rotate along a circumferential direction within a casing of the turbomachine and a shroud positioned outward of the rotor blade along a radial direction. The rotor blade includes a root, a tip spaced radially outward from the root, a pressure side tip rail that extends around the tip of the rotor blade along a pressure side wall, and a suction side tip rail that extends around the tip of the rotor blade along a suction side wall. The shroud includes a radially inner surface facing the pressure side tip rail and the suction side tip rail of the rotor blade and spaced from the pressure side tip rail and the suction side tip rail of the rotor blade by a clearance gap. The shroud also includes a plurality of grooves extending continuously along the circumferential direction.

18 Claims, 18 Drawing Sheets

(52) U.S. Cl.
CPC .... *F05D 2220/323* (2013.01); *F05D 2240/11* (2013.01); *F05D 2240/14* (2013.01); *F05D 2240/30* (2013.01); *F05D 2250/12* (2013.01); *F05D 2250/182* (2013.01); *F05D 2250/294* (2013.01)

(58) Field of Classification Search
CPC .............. F05F 2240/30; F05F 2250/12; F05F 2220/31; F05F 2220/323; F05F 2240/11
USPC ........................................................ 415/115
See application file for complete search history.

(56) References Cited

U.S. PATENT DOCUMENTS

| | | | |
|---|---|---|---|
| 4,761,116 A | 8/1988 | Braddy et al. | |
| 5,282,721 A | 2/1994 | Kildea | |
| 5,503,527 A * | 4/1996 | Lee | F01D 5/20 415/173.1 |
| 6,027,306 A * | 2/2000 | Bunker | F01D 5/20 415/115 |
| 6,059,530 A * | 5/2000 | Lee | F01D 5/145 416/96 A |
| 6,142,734 A * | 11/2000 | Lee | F01D 5/189 416/97 R |
| 6,155,778 A * | 12/2000 | Lee | F01D 5/20 415/116 |
| 6,290,458 B1 * | 9/2001 | Irie | F01D 5/145 415/119 |
| 6,350,102 B1 * | 2/2002 | Bailey | F01D 5/20 415/173.5 |
| 6,478,537 B2 | 11/2002 | Junkin | |
| 7,118,329 B2 | 10/2006 | Goodman | |
| 7,513,743 B2 | 4/2009 | Liang | |
| 7,614,847 B2 | 11/2009 | Nelson et al. | |
| 7,704,047 B2 | 4/2010 | Liang et al. | |
| 8,113,779 B1 * | 2/2012 | Liang | F01D 5/20 416/92 |
| 8,182,221 B1 | 5/2012 | Liang | |
| 8,313,287 B2 * | 11/2012 | Little | F01D 5/187 415/173.1 |
| 8,414,262 B2 | 4/2013 | Hada | |
| 8,439,634 B1 * | 5/2013 | Liang | F01D 11/10 415/115 |
| 8,475,122 B1 * | 7/2013 | Liang | F01D 11/24 415/115 |
| 8,512,003 B2 | 8/2013 | Klasing et al. | |
| 8,684,691 B2 | 4/2014 | Lee et al. | |
| 8,939,716 B1 * | 1/2015 | Lee | F01D 11/122 415/173.1 |
| 2002/0041805 A1 * | 4/2002 | Kurokawa | F01D 5/145 415/119 |
| 2005/0003172 A1 * | 1/2005 | Wheeler | C23C 4/04 428/210 |
| 2006/0088420 A1 * | 4/2006 | Lee | B23P 6/007 416/235 |
| 2006/0110248 A1 * | 5/2006 | Nelson | F01D 11/12 415/173.4 |
| 2010/0135813 A1 * | 6/2010 | Marini | F01D 5/20 416/223 R |
| 2011/0091327 A1 * | 4/2011 | Willett, Jr. | F01D 5/145 416/235 |
| 2013/0142651 A1 * | 6/2013 | Lim | F01D 5/145 416/91 |
| 2013/0202439 A1 * | 8/2013 | Bruce | F01D 11/122 416/189 |
| 2013/0236298 A1 * | 9/2013 | Chouhan | F01D 11/02 415/173.5 |
| 2013/0280049 A1 * | 10/2013 | Fisk | F01D 5/225 415/173.4 |
| 2014/0037458 A1 * | 2/2014 | Lacy | F01D 5/186 416/97 R |
| 2014/0311164 A1 * | 10/2014 | Kwon | F01D 5/20 60/806 |
| 2014/0366545 A1 * | 12/2014 | Nakamata | F01D 11/10 60/754 |
| 2015/0093281 A1 * | 4/2015 | Campomanes | B22F 3/12 419/38 |
| 2015/0337672 A1 * | 11/2015 | McCaffrey | F01D 11/08 415/173.1 |
| 2016/0258301 A1 | 9/2016 | Chouhan et al. | |
| 2016/0341058 A1 * | 11/2016 | Nishikawa | F01D 9/02 |
| 2017/0058680 A1 * | 3/2017 | Chouhan | F01D 5/20 |
| 2018/0010467 A1 * | 1/2018 | Zhang | F01D 5/20 |
| 2018/0094637 A1 * | 4/2018 | Van Houten | F04D 29/685 |
| 2018/0223681 A1 * | 8/2018 | Gallier | F01D 25/12 |
| 2018/0231023 A1 * | 8/2018 | Gentry | F01D 11/122 |
| 2019/0136700 A1 * | 5/2019 | Martin, Jr. | F01D 5/225 |

\* cited by examiner

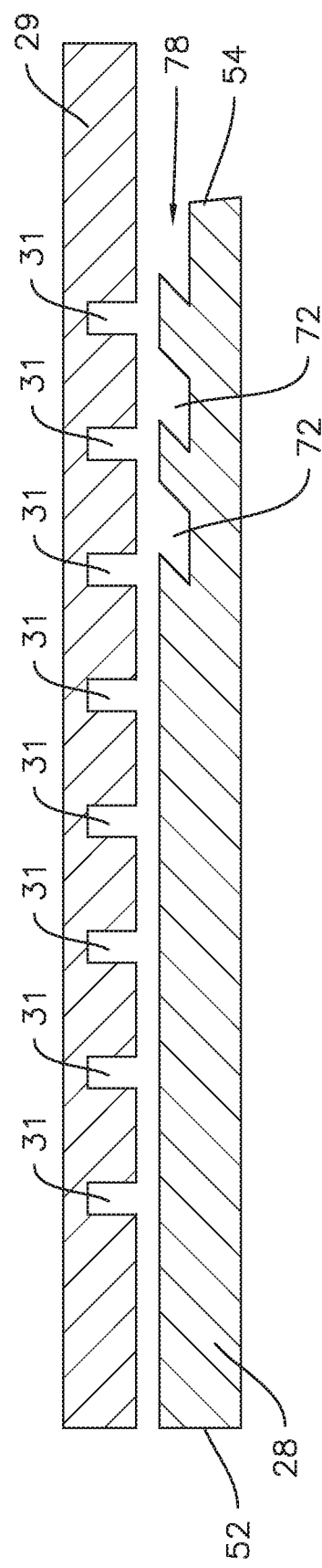
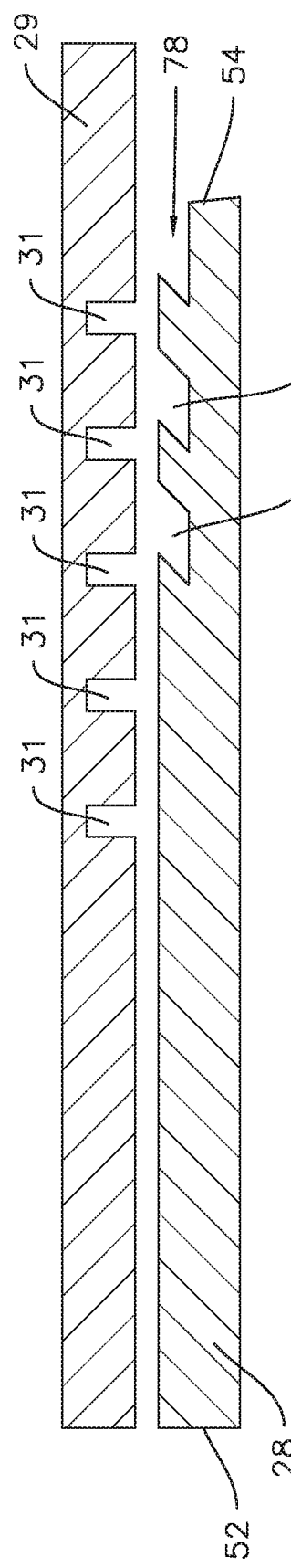
Fig. 25
Fig. 26

SYSTEMS INCLUDING ROTOR BLADE TIPS AND CIRCUMFERENTIALLY GROOVED SHROUDS

RELATED APPLICATIONS

This application is a continuation-in-part of and claims priority to U.S. patent application Ser. No. 15/591,242 filed on May 10, 2017.

FIELD

The present disclosure generally relates to a system for a turbomachine including a rotor blade tip and a shroud. In particular, systems according to this disclosure include a shroud having vortex cancellation features.

BACKGROUND

Turbomachines are widely utilized in fields such as power generation. For example, a conventional gas turbine system includes a compressor section, a combustor section, and at least one turbine section. The compressor section is configured to compress air as the air flows through the compressor section. The air is then flowed from the compressor section to the combustor section, where it is mixed with fuel and combusted, generating a hot gas flow. The hot gas flow is provided to the turbine section, which utilizes the hot gas flow by extracting energy from it to power the compressor, an electrical generator, and other various loads.

The turbine section typically includes multiple stages which are disposed along the hot gas path such that the hot gases flow through first-stage nozzles and rotor blades and through the nozzles and rotor blades of follow-on turbine stages. The turbine rotor blades may be secured to a plurality of rotor disks comprising the turbine rotor, with each rotor disk being mounted to the rotor shaft for rotation therewith.

A turbine rotor blade generally includes an airfoil extending radially outwardly from a substantially planar platform and a shank portion extending radially inwardly from the platform for securing the rotor blade to one of the rotor disks. The tip of the airfoil is typically spaced radially inwardly from a stationary shroud of the turbomachine such that a small gap is defined between the tip and the shroud. This gap is typically sized as small as practical to minimize the flow of hot gases between the airfoil tip and the shroud.

In many instances, the tip of the airfoil may include a squealer tip wall extending around the perimeter of the airfoil so as to define a tip cavity and a tip floor therebetween. The squealer tip wall is generally used to reduce the size of the gap defined between the airfoil tip and the shroud. However, this creates an additional component of the turbine rotor blade that is subject to heating by the hot gas flowing around the airfoil. Thus, cooling holes are typically defined in the tip floor to allow a cooling medium to be directed from an airfoil cooling circuit within the airfoil to the tip cavity. Although the squealer tip wall reduces the size of the gap defined between the airfoil tip and the shroud, some over tip leakage can roll over the tip wall. Such flows may result in formation of a strong vortex flow on the suction side of the blade surface, which leads to entropy generation and loss in performance.

BRIEF DESCRIPTION

Aspects and advantages of the technology are set forth below in the following description, or may be obvious from the description, or may be learned through practice of the technology.

According to one example embodiment, a system for a turbomachine is provided. The turbomachine includes a casing. The system includes a rotor blade configured to rotate along a circumferential direction within the casing. The rotor blade includes a leading edge and a trailing edge downstream of the leading edge. The rotor blade also includes a root extending between the leading edge and the trailing edge and a tip spaced radially outward from the root. The tip includes a tip floor. The rotor blade also includes a pressure side wall extending between the root and the tip and extending between the leading edge and the trailing edge. The rotor blade further includes a suction side wall extending between the root and the tip and extending between the leading edge and the trailing edge. The suction side wall opposes the pressure side wall. The rotor blade also includes a pressure side tip rail that extends outwardly along a radial direction from the tip floor between the leading edge and the trailing edge along the pressure side wall and a suction side tip rail that extends outwardly along the radial direction from the tip floor between the leading edge and the trailing edge along the suction side wall. A tip cavity is defined by the tip floor, the pressure side tip rail and the suction side tip rail. The tip cavity defines a radial extent outward of the tip floor. The system also includes a shroud positioned outward of the rotor blade along the radial direction. A radially inner surface of the shroud faces the pressure side tip rail and the suction side tip rail of the rotor blade and is spaced from the pressure side tip rail and the suction side tip rail of the rotor blade by a clearance gap. The shroud includes a plurality of grooves extending continuously along the circumferential direction. The plurality of grooves extend from the radially inner surface of the shroud into a main body of the shroud.

In accordance with another example embodiment, a gas turbine is provided. The gas turbine includes a compressor, a combustor disposed downstream from the compressor, and a turbine disposed downstream from the combustor. The turbine includes a rotor shaft extending along an axial direction through the turbine, a casing extending along a circumferential direction and surrounding the rotor shaft, a plurality of rotor blades interconnected to the rotor shaft and extending along a radial direction from the rotor shaft, the plurality of rotor blades defining a stage of rotor blades, and a shroud connected to the casing between the casing and the plurality of rotor blades. Each rotor blade includes a mounting portion including a mounting body, the mounting body being interconnectable with the rotor shaft, and an airfoil coupled to the mounting portion. The airfoil includes a leading edge and a trailing edge downstream of the leading edge. The airfoil also includes a root extending between the leading edge and the trailing edge and a tip spaced radially outward from the root. The tip includes a tip floor. The airfoil also includes a pressure side wall extending between the root and the tip and extending between the leading edge and the trailing edge. The airfoil further includes a suction side wall extending between the root and the tip and extending between the leading edge and the trailing edge. The suction side wall opposes the pressure side wall. The airfoil also includes a pressure side tip rail that extends radially outwardly from the tip floor between the leading edge and the trailing edge along the pressure side wall and a suction side tip rail that extends radially outwardly from the tip floor between the leading edge and the trailing edge along the suction side wall. A tip cavity is defined by the tip floor, the pressure side tip rail and the suction side tip rail. The tip cavity defines a radial extent outward of the tip floor. The shroud includes a radially inner surface facing the pressure side tip rail and the suction side tip rail of the rotor blade.

The radially inner surface of the shroud is also spaced from the pressure side tip rail and the suction side tip rail of the rotor blade by a clearance gap. The shroud includes a plurality of grooves extending continuously along the circumferential direction. The plurality of grooves extend from the radially inner surface of the shroud into a main body of the shroud.

Those of ordinary skill in the art will better appreciate the features and aspects of such embodiments, and others, upon review of the specification.

BRIEF DESCRIPTION OF THE DRAWINGS

A full and enabling disclosure of the present subject matter, including the best mode thereof to one skilled in the art, is set forth more particularly in the remainder of the specification, including reference to the accompanying figures.

FIG. 25 is a side sectional view of a portion of a shroud and airfoil according to one or more embodiments of the disclosure.

FIG. 26 is a side sectional view of a portion of a shroud and airfoil according to one or more embodiments of the disclosure.

DETAILED DESCRIPTION

Figure 1:
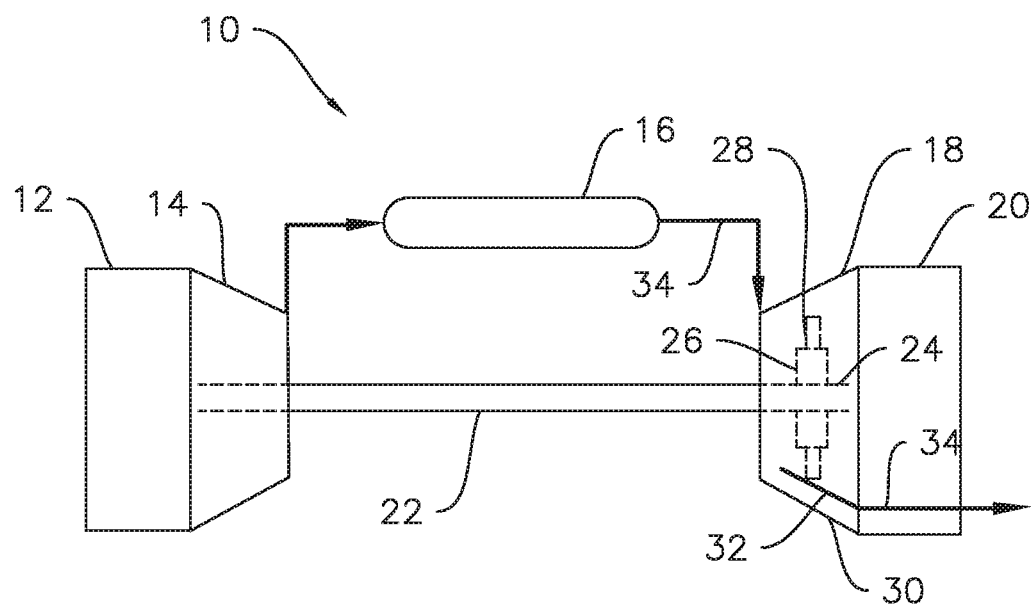
FIG. 1 illustrates a functional diagram of an exemplary gas turbine which may incorporate one or more embodiments of the present disclosure.

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel and/or coaxially aligned to an axial centerline of a particular component.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents. Although an industrial or land based gas turbine is shown and described herein, the present technology as shown and described herein is not limited to a land based and/or industrial gas turbine unless otherwise specified in the claims. For example, the technology as described herein may be used in any type of turbine including but not limited to a steam turbine, an aircraft gas turbine or marine gas turbine.

Referring now to the drawings, FIG. 1 illustrates a schematic diagram of one embodiment of a gas turbine 10. The gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16 and an exhaust section 20 disposed downstream of the turbine section 18. Additionally, the gas turbine 10 may include one or more shafts 22 coupled between the compressor section 14 and the turbine section 18.

The turbine section 18 may generally include a rotor shaft 24 having a plurality of rotor disks 26 (one of which is shown) and a plurality of rotor blades 28 extending radially outwardly from and being interconnected to each rotor disk 26. Each rotor disk 26 may, in turn, be coupled to a portion of the rotor shaft 24 that extends through the turbine section 18. The turbine section 18 further includes an outer casing 30 that circumferentially surrounds the rotor shaft 24 and the rotor blades 28, thereby at least partially defining a hot gas path 32 through the turbine section 18.

During operation, a working fluid such as air flows through the inlet section 12 and into the compressor section 14 where the air is progressively compressed, thus providing pressurized air to the combustors of the combustion section 16. The pressurized air is mixed with fuel and burned within each combustor to produce hot gases of combustion 34. The hot gases of combustion 34 flow through the hot gas path 32 from the combustor section 16 to the turbine section 18, wherein energy (kinetic and/or thermal) is transferred from the hot gases 34 to the rotor blades 28, thus causing the rotor shaft 24 to rotate. The mechanical rotational energy may then be used, e.g., to power the compressor section 14 and generate electricity. The hot gases of combustion 34 exiting the turbine section 18 may then be exhausted from the gas turbine 10 via the exhaust section 20.

Figure 2:
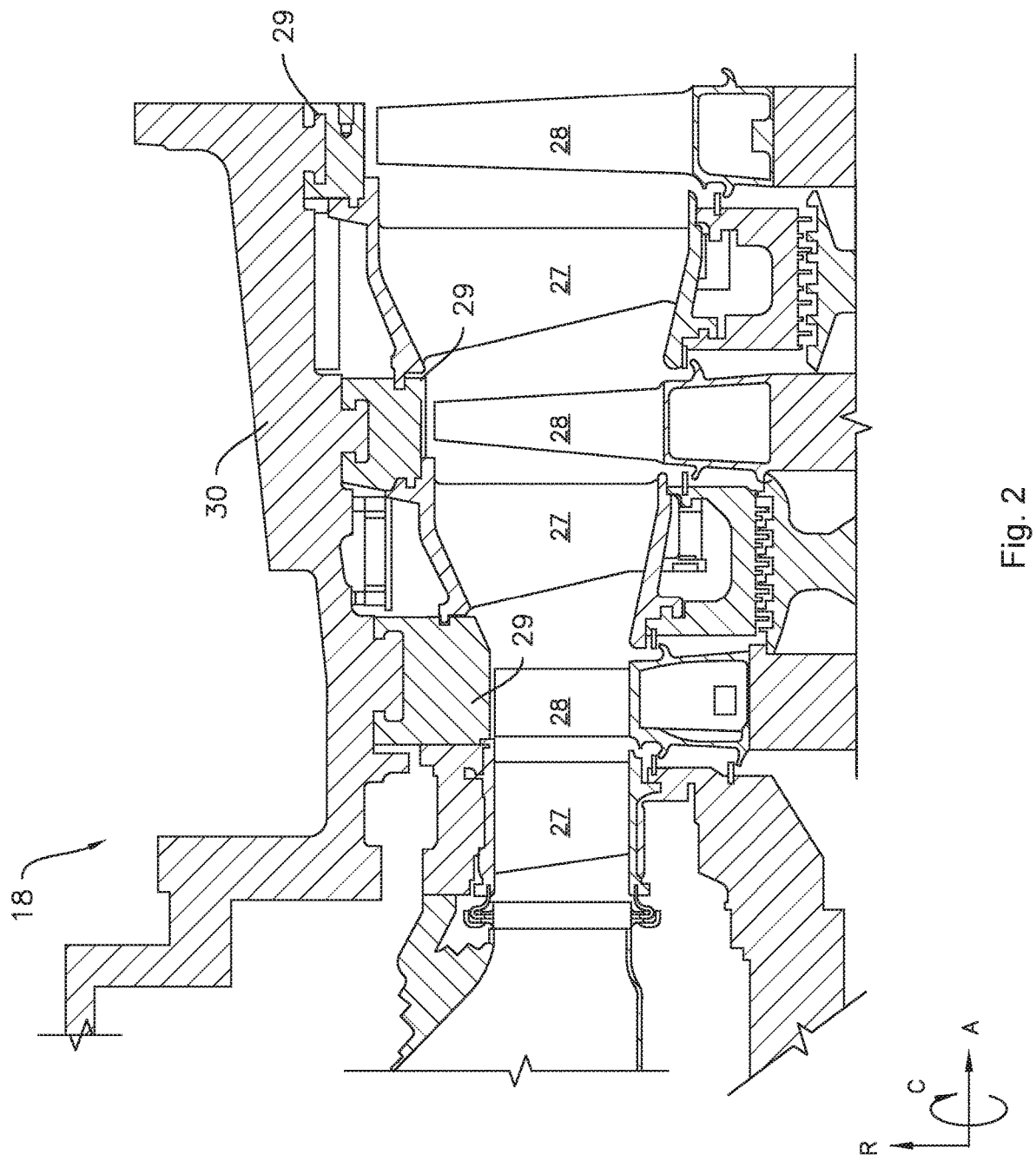
FIG. 2 is a section view of an exemplary turbine section of a gas turbine which may incorporate various embodiments of the present disclosure.

FIG. 2 illustrates a section through a portion of a gas turbine 10, such as the gas turbine 10 schematically depicted in FIG. 1. As noted in FIG. 2, the gas turbine 10 may include a central axis, e.g., along shaft 22 (FIG. 1), and the central axis of the gas turbine may define an axial direction A, a radial direction R perpendicular to the axial direction A, and a circumferential direction C which extends around the axial direction A. In particular, FIG. 2 illustrates a section view of an exemplary turbine 18 as may incorporate various embodiments of the present disclosure. As shown in FIG. 2, the turbine 18 may include multiple turbine stages, e.g., three turbine stages, each stage including a row of stationary turbine nozzles 27 and a corresponding row of turbine rotor blades 28. The total number of turbine stages may be more or less than three and embodiments of the present technology are not limited to three turbine stages unless otherwise recited in the claims.

A casing or shell 30 circumferentially surrounds the turbine nozzles 27 and the turbine rotor blades 28. The turbine nozzles 27 remain stationary relative to the turbine rotor blades 28 during operation of the gas turbine 10. Radially outward of each rotor blade 28 is a shroud 29. The nozzles and shrouds of each stage may include similar features as the nozzles and shrouds of any other stage. Accordingly, for the sake of clarity, the following description will refer primarily to a single stage, e.g., a single rotor blade 28 or a single row of rotor blades 28, it being understood that the same features or similar features may be provided in any stage of the turbine, or all stages of the turbine, or any combination of stages.

Figure 3:
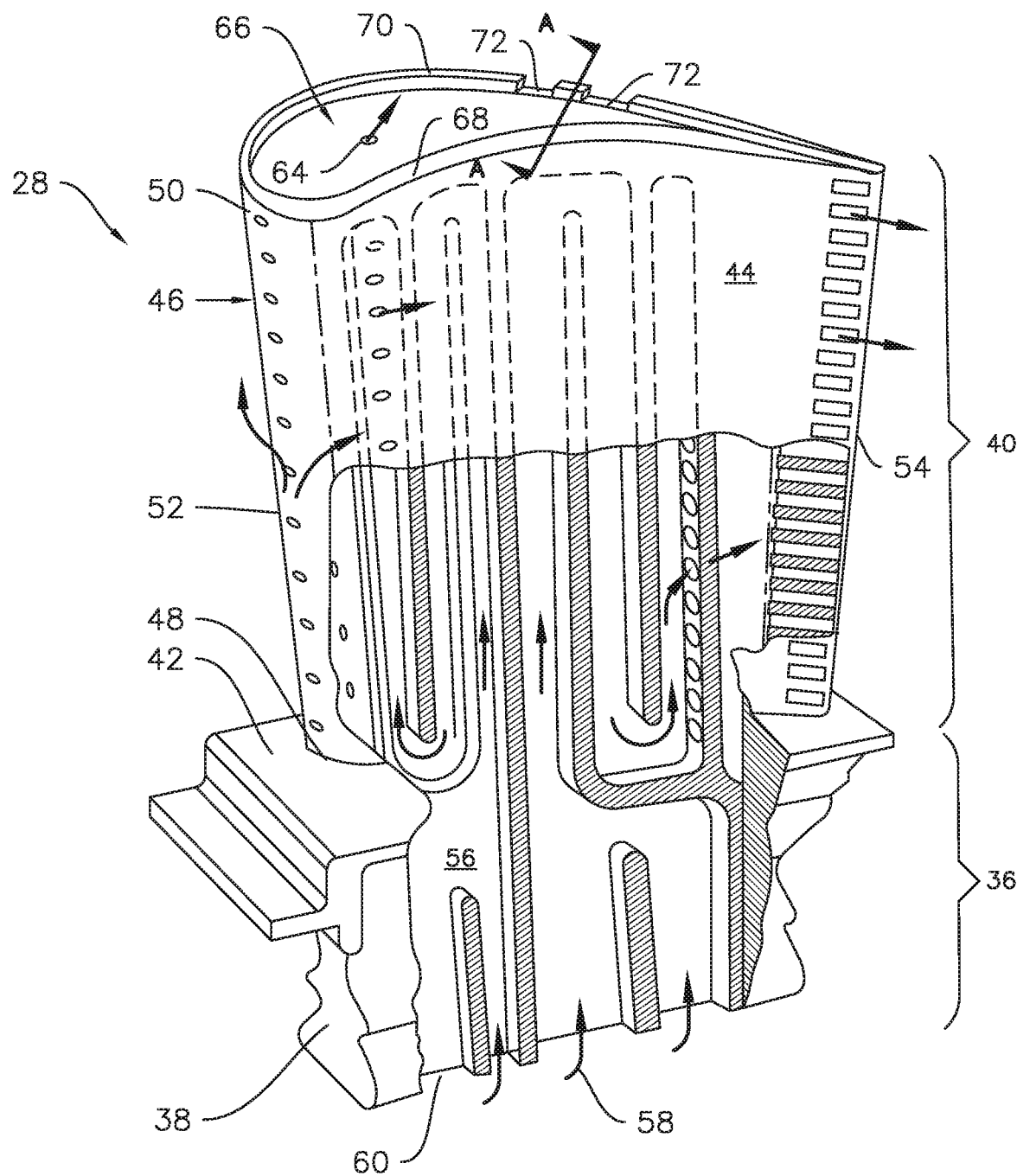
FIG. 3 is a perspective view of an exemplary rotor blade as may incorporate various embodiments of the present disclosure.

FIG. 3 is a perspective view of an exemplary rotor blade 28 as may incorporate one or more embodiments of the present technology. As shown in FIG. 3, the rotor blade 28 generally includes a mounting or shank portion 36 having a mounting body 38 and an airfoil 40 that extends substantially radially outwardly from a substantially planar platform 42. The platform 42 generally serves as the radially inward boundary for the hot gases of combustion 34 flowing through the hot gas path 32 of the turbine section 18 (FIG. 1). As shown in FIG. 2, the mounting body 38 of the mounting or shank portion 36 may extend radially inwardly from the platform 42 and may include a root structure, such as a dovetail, configured to interconnect or secure the rotor blade 28 to the rotor disk 26 (FIG. 1).

The airfoil 40 includes a pressure side wall 44 and an opposing suction side wall 46. The pressure side wall 44 and the suction side wall 46 extend substantially radially outwardly from the platform 42 in span from a root 48 of the airfoil 40 which may be defined at an intersection between the airfoil 40 and the platform 42, and a tip 50 of the airfoil 40. The airfoil 40 defines a chord C (FIG. 4), which is defined by a straight line extending between a leading edge 52 of the airfoil 40 and a trailing edge 54 downstream of the leading edge 52. The pressure side wall 44 generally comprises an aerodynamic, concave external surface of the airfoil 40. Similarly, the suction side wall 46 may generally define an aerodynamic, convex external surface of the airfoil 40. The tip 50 is disposed radially opposite the root 48. As such, the tip 50 may generally define the radially outermost portion of the rotor blade 28 and, thus, may be configured to be positioned adjacent to a stationary shroud or seal (not shown) of the gas turbine 10. The tip 50 includes a tip cavity 66.

As shown in FIG. 3, a plurality of cooling passages 56 (shown partially in dashed lines in FIG. 3) is circumscribed within the airfoil 40 for routing a coolant 58 through the airfoil 40 between the pressure side wall 44 and the suction side wall 46, thus providing convective cooling thereto. The coolant 58 may include a portion of the compressed air from the compressor section 14 (FIG. 1) and/or steam or any other suitable fluid or gas for cooling the airfoil 40. One or more cooling passage inlets 60 are disposed along the rotor blade 28. In some embodiments, one or more cooling passage inlets 60 are formed within, along or by the mounting body 38. The cooling passage inlets 60 are in fluid communication with at least one corresponding cooling passage 56.

Figure 4:
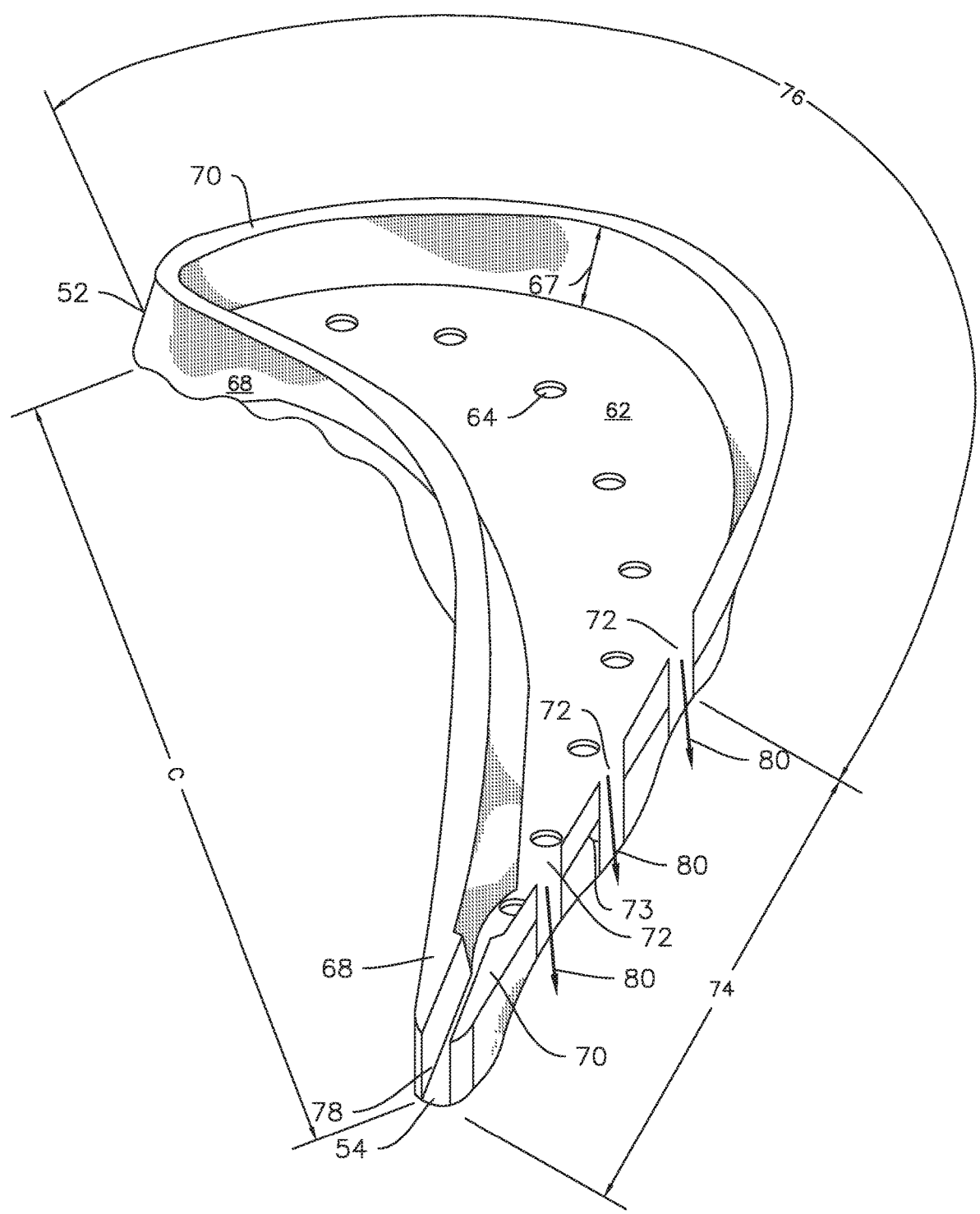
FIG. 4 is a top view of the exemplary rotor blade as shown in FIG. 3, according to some embodiments of the disclosure.

FIG. 4 is an enlarged view of the tip 50 of the airfoil 40 as shown in FIG. 3, according to one embodiment of the present disclosure. As shown in FIG. 4, the tip 50 includes a tip floor 62. The tip floor 62 generally extends between the pressure and suction side walls 44, 46 and the leading and trailing edges 52, 54 of the airfoil 40. A plurality of coolant outlets 64 may be in fluid communication with the tip cavity 66. For example, in some embodiments, the plurality of coolant outlets may be disposed along the tip floor 62. Each cooling passage 56 (FIG. 3) is in fluid communication with at least one of the coolant outlets 64.

As shown in FIG. 4, the tip cavity 66 is at least partially surrounded by a pressure side tip rail 68 and a suction side tip rail 70. Each tip rail 68, 70 extends radially outwardly from the tip floor 62. The pressure side tip rail 68 extends along a perimeter of the tip floor 62 between the leading edge 52 and the trailing edge 54 and generally conforms in profile to the pressure side wall 44. The suction side tip rail 70 extends along the perimeter of the tip floor 62 between the leading edge 52 and the trailing edge 54 and generally conforms in profile to the suction side wall 46. The pressure side tip rail 68 and the suction side tip rail 70 are joined at the leading edge 52. Accordingly, the tip cavity 66 is defined by the tip floor 62, the pressure side tip rail 68 and the suction side tip rail 70. The tip cavity 66 extends radially outward from the tip floor 62, defining a radial extent 67 outward of the tip floor 62.

Some embodiments may include one or more slots 72 formed in an aft portion 74 of the suction side tip rail 70. In some embodiments, a plurality of slots 72 may be formed in the aft portion 74 of the suction side tip rail 70. For example, as illustrated in FIG. 3, two slots may be provided. As another example, as illustrated in FIG. 4, three slots may be provided. In other embodiments, additional slots 72, e.g., four, five, or more slots, may be provided.

In some embodiments, the suction side tip rail 70 may be continuous over a forward portion 76, e.g., no slots 72 may be formed in the forward portion 76, and the suction side tip rail 70 may include slots 72 only in the aft portion 74. The forward portion 76 is forward (upstream) of the aft portion 74, such that the forward portion 76 extends between the aft portion 74 and the leading edge 52, and the aft portion 74 extends between the forward portion 76 and the trailing edge 54.

The forward portion 76 may be at least half of the chordal extent of the suction side 70, e.g., the forwardmost slot 72 may be positioned about halfway between the leading edge 52 and the trailing edge 54 along the direction of the chord C. In such embodiments, the aft portion 74 of the suction side tip rail 70 may make up the remaining portion, e.g., about half, of the suction side tip rail 70. In some embodiments, the aft portion 74 of the suction side tip rail 70 may extend over less than half of the chordal extent of the suction side tip rail 70. In some embodiments, the forward portion 76 may be about seventy percent of the chordal extent of the suction side tip rail 70. In some embodiments, the aft portion 74 of the suction side tip rail 70 may include about twenty percent of the chordal extent of the suction side tip rail 70. As used herein, terms of approximation such as "about" includes within ten percent more or less than the stated value. For example, when the stated value is a percent, "about" includes within ten percentage points more or less than the stated value, e.g., "about seventy percent" encompasses an inclusive range from sixty percent to eighty percent.

In some embodiments, the forward portion 76 may be about seventy-five percent (75%) of the chordal extent of the suction side tip rail 70, such that the forwardmost edge of the first or forwardmost slot 72 is spaced from the leading edge 52 by about seventy-five percent (75%) of the distance C between the leading edge 52 and the trailing edge 54. In such embodiments, the first slot 72 may extend over two and a half percent (2.5%) of the chordal extent of the suction side tip rail 70, such that the aft edge of the first slot 72 may be spaced from the leading edge 52 by about seventy-seven and a half percent (77.5%) of the distance C between the leading edge 52 and the trailing edge 54. Further, in some such embodiments may also include a plurality of slots 72. For example, a second slot 72 may be provided aft of the first slot 72 by about four percent (4%) of the chordal extent of the suction side tip rail 70. Accordingly, the forwardmost edge of the second slot 72 may be spaced from the leading edge 52 by about eighty-one and a half percent (81.5%) of the distance C between the leading edge 52 and the trailing edge 54. In such embodiments, the second slot 72 may extend over two and a half percent (2.5%) of the chordal extent of the suction side tip rail 70, such that the aft edge of the second slot 72 may be spaced from the leading edge 52 by about eighty four percent (84%) of the distance C between the leading edge 52 and the trailing edge 54. In some exemplary embodiments, a third slot 72 may also be provided. In such embodiments, the third slot 72 may be provided aft of the second slot 72 by about four percent (4%) of the chordal extent of the suction side tip rail 70. Accordingly, the forwardmost edge of the third slot 72 may be spaced from the leading edge 52 by about eighty-eight percent (88%) of the distance C between the leading edge 52 and the trailing edge 54. In such embodiments, the third slot 72 may extend over two and a half percent (2.5%) of the chordal extent of the suction side tip rail 70, such that the aft edge of the third slot 72 may be spaced from the leading edge 52 by about ninety and a half percent (90.5%) of the distance C between the leading edge 52 and the trailing edge 54.

Also illustrated in FIG. 4, some embodiments may include an opening 78 between the suction side tip rail 70 and the pressure side tip rail 68 at the trailing edge 54. Slots 72 and opening 78 may advantageously provide a vortex-cancelling flow, as indicated by arrows 80, to disrupt and/or prevent vortex formation on the suction side of the airfoil 40. For example, in the illustrated embodiments, gas flows into the tip cavity 66 from the coolant outlets 64 and gas also flows into the tip cavity 66 over the top of the pressure side tip rail 68. Such gas may then flow out of the tip cavity 66. For example, the gas may flow from the tip cavity 66 via the slots 72 and the opening 78, and may inhibit formation of a vortex flow proximate to the suction side wall 46.

In various embodiments, as shown and described herein, various combinations and configurations of the one or more slots 72 and the opening 78 may be provided in the aft portion 74 of the suction side tip rail 70. In contrast, no slots 72 or openings 78 may be provided in the forward portion 76 of the suction side tip rail 70 or in the pressure side tip rail 68. Thus, the pressure side tip rail 68 may be continuous and uninterrupted along the pressure side wall 44. Also, the pressure side tip rail 68 may define a constant radial height, and the pressure side tip rail 68 may be continuous and uninterrupted over the constant radial height. Similarly, the suction side tip rail 70 may consist of the forward portion 76 and the aft portion 74. The forward portion 76 of the suction side tip rail 70 may be continuous and uninterrupted along the suction side wall 46 from the aft portion 74 to the leading edge 52. The forward portion 76 of the suction side tip rail 70 may also define a constant radial height, and the forward portion 76 of the suction side tip rail 70 may be continuous and uninterrupted over the constant radial height.

As illustrated in FIG. 4, the one or more slots 72 may form an angle 73 with the suction side wall 46. In various embodiments, the angle 73 may be between about thirty twenty-five degrees and about sixty-five degrees. For example, the angle 73 may be between about thirty degrees and about sixty degrees. For example, the angle 73 may be between about forty degrees and about fifty degrees. For example, the angle 73 may be about forty-five degrees. As used herein, "about" in the context of an angle or direction means within ten degrees above or below the stated value. In other embodiments, any suitable angle 73 may be provided. As yet another non-limiting example, the one or more slots 72 may be normal to the suction side wall 46, e.g., the angle 73 may be about ninety degrees.

Figure 5:
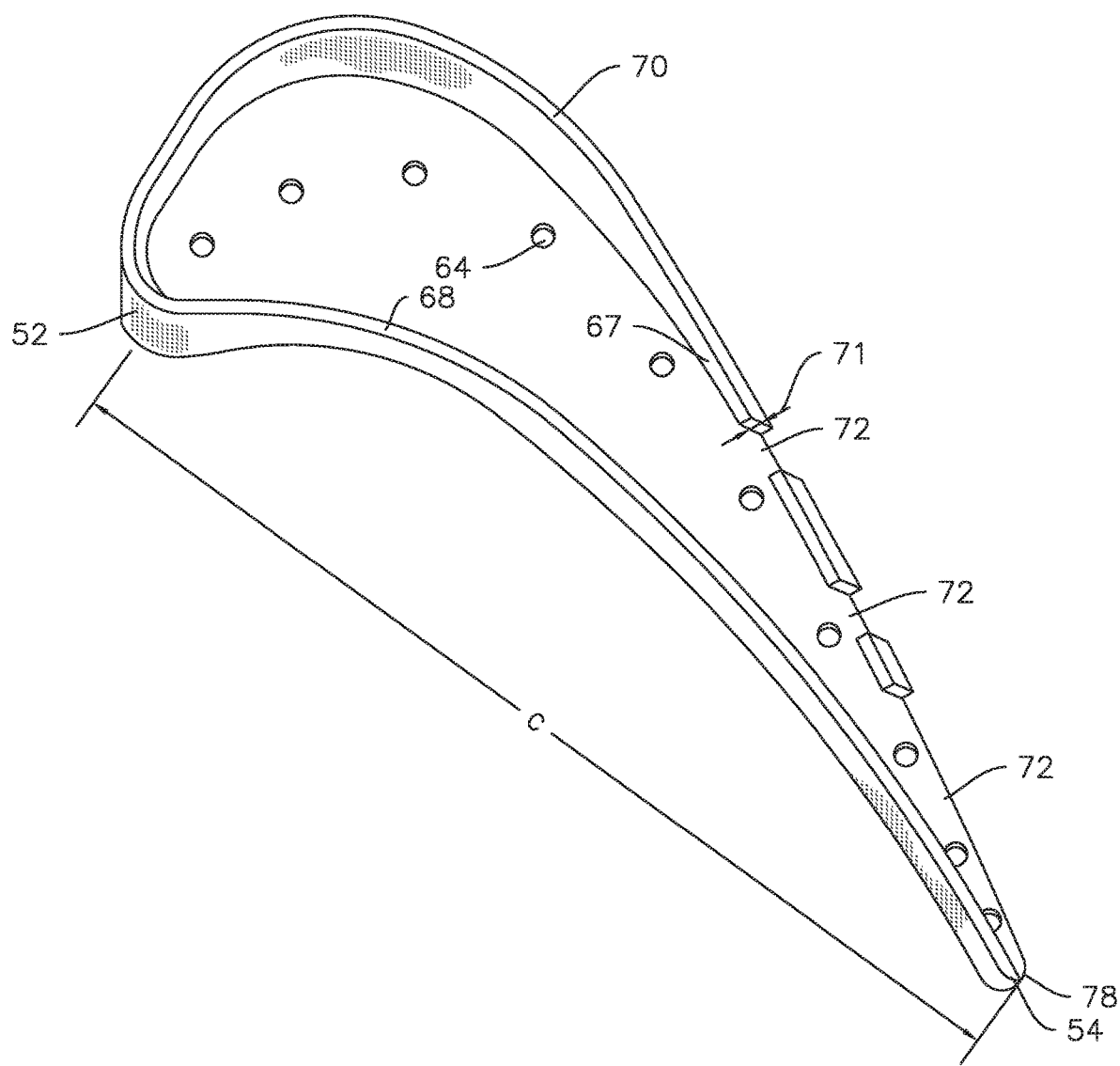
FIG. 5 is a top view of the exemplary rotor blade as shown in FIG. 3, according to some embodiments of the disclosure.
Figures 6, 7:
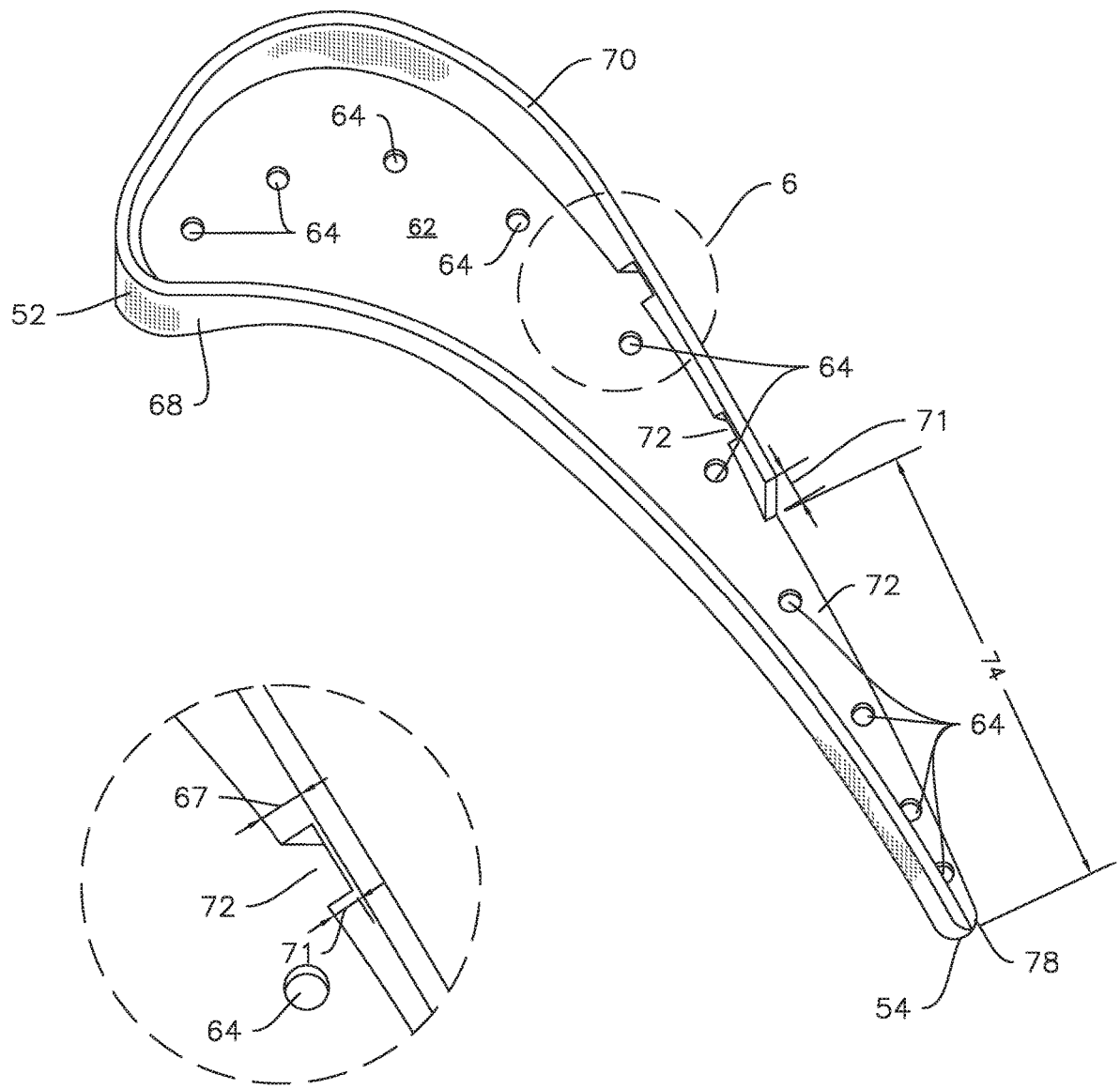
FIG. 6 is a top view of the exemplary rotor blade as shown in FIG. 3, according to some embodiments of the disclosure.
FIG. 7 is an enlarged view of a portion of FIG. 6.
Figure 8:
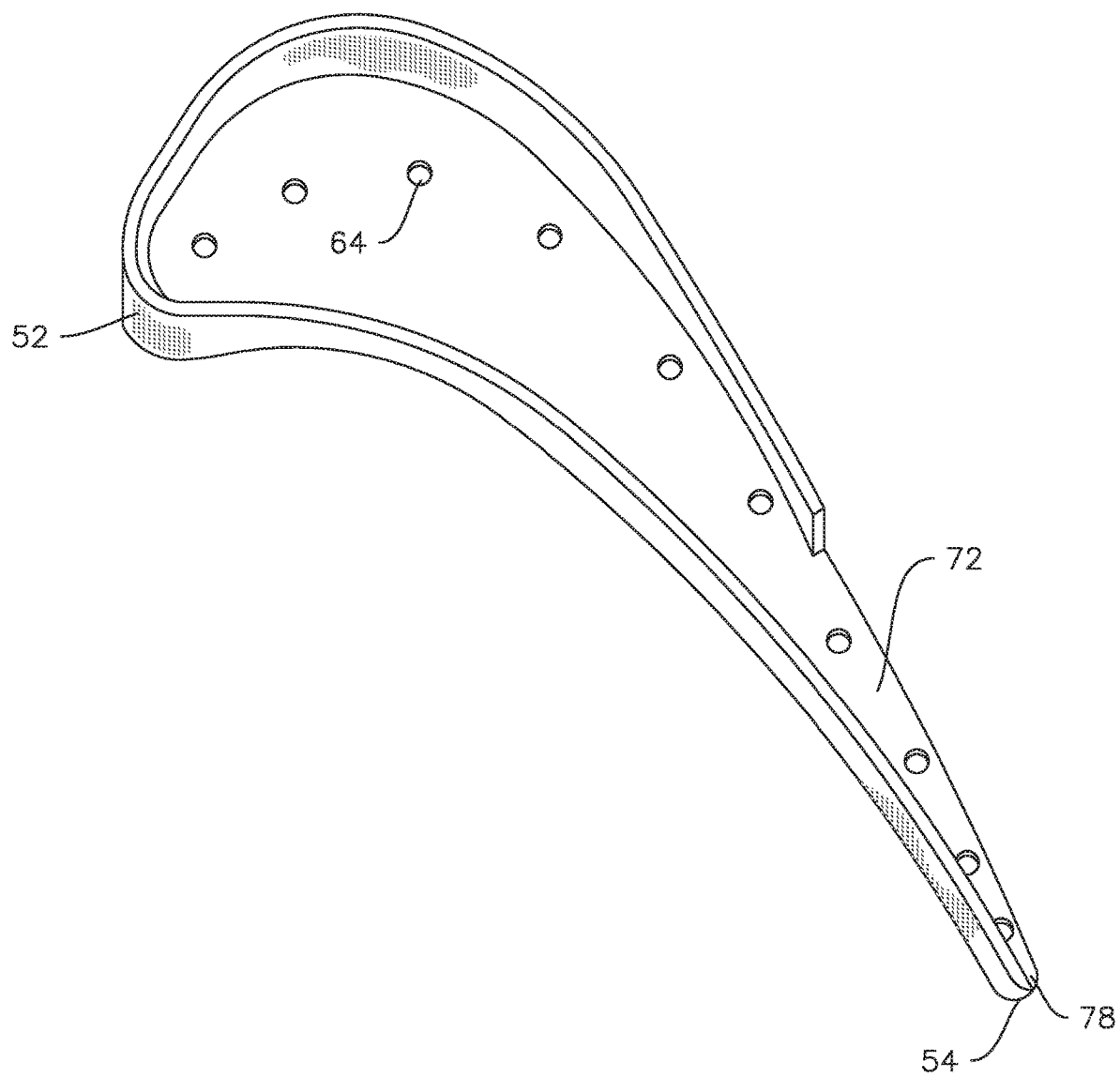
FIG. 8 is a top view of the exemplary rotor blade as shown in FIG. 3, according to some embodiments of the disclosure.

In some embodiments, for example as illustrated in FIG. 4, the slots 72 may be distinct from the opening 78. In other embodiments, e.g., as illustrated in FIGS. 5 and 6, a plurality of slots 72 may be provided, and one slot 72 of the plurality of slots 72 may be contiguous with the opening 78, e.g., one of the slots 72 may merge with the opening 78 such that the aftmost portion of the suction side tip rail 70 is completely open. In such embodiments, the suction side tip rail 70 may not extend fully to the trailing edge 54 along the suction side wall 46. In some embodiments, e.g., as illustrated in FIG. 7, a single slot 72 may be provided. In embodiments where a single slot 72 is provided, the slot may be distinct from the opening, for example, any one of the several such slots 72 illustrated in FIGS. 4 through 6 may be a single slot 72. In other embodiments where a single slot 72 is provided, the slot may be contiguous with the opening 78, as illustrated for example in FIG. 8.

As noted above, the tip cavity 66 may define a radial extent 67. Further, in some embodiments, the slot 72 may define a height 71 (FIGS. 5 through 7) radially outward of the tip floor 62. In some embodiments, the slot 72 may be radially coextensive with the suction side tip rail 70, e.g., the height 71 of the slot 72 may be the same as the radial extent 67 of the tip cavity 66, for example as illustrated in FIGS. 4 and 5. In some embodiments, e.g., as illustrated in FIG. 7, the height 71 of the slot 72 may be less than the radial extent 67 of the tip cavity 66.

Figure 9:
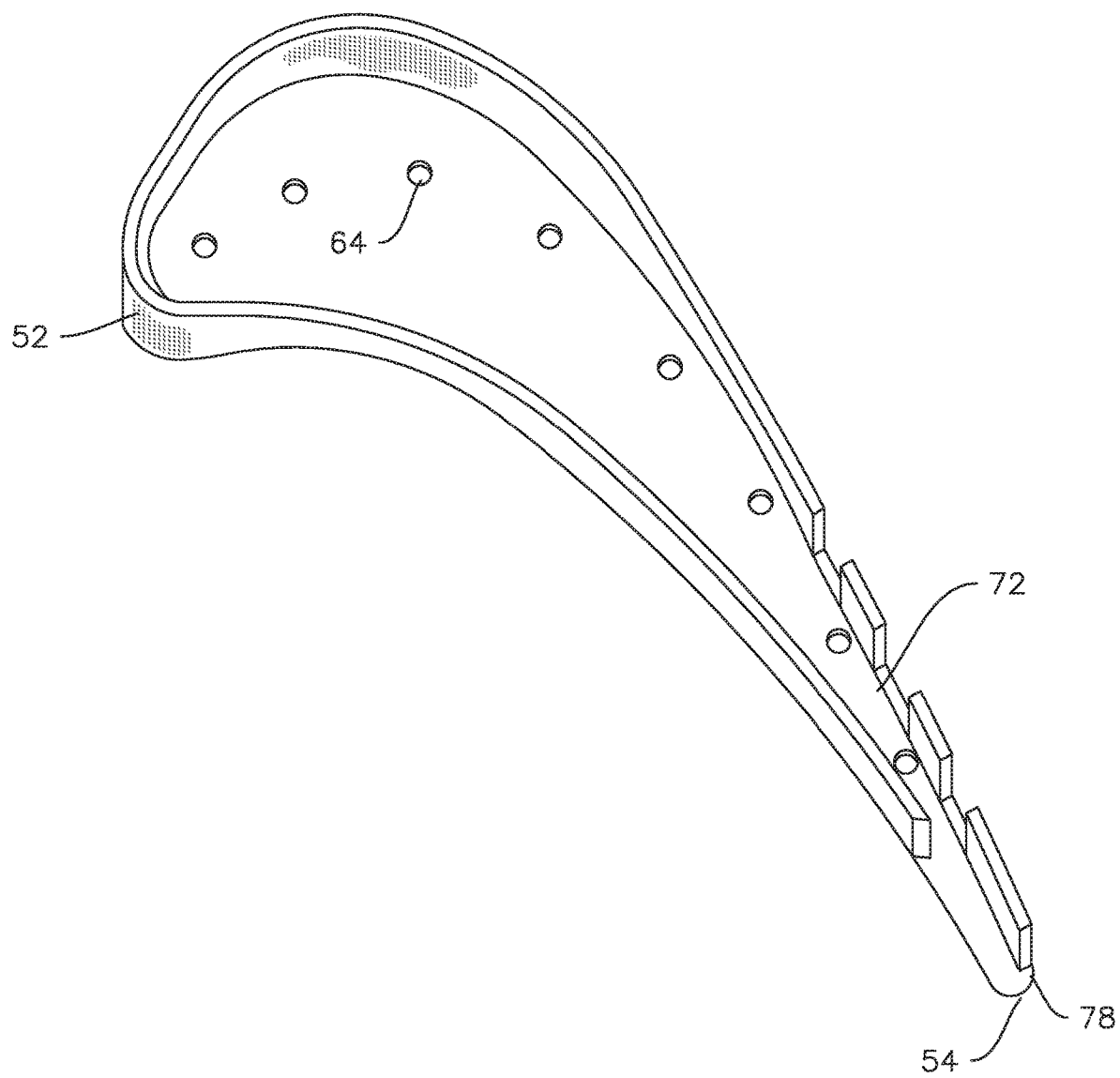
FIG. 9 is a top view of the exemplary rotor blade as shown in FIG. 3, according to alternative embodiments of the disclosure.

As illustrated in FIG. 9, in at least one alternative embodiment, the pressure side tip rail 68 may not extend fully to the trailing edge 54.

Figure 10:
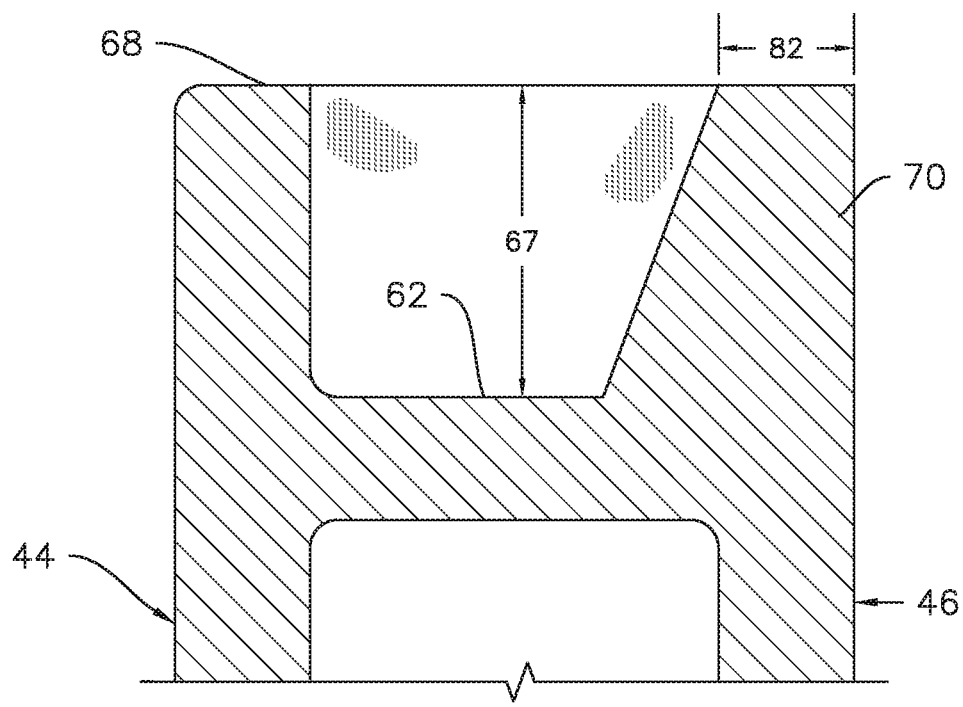
FIG. 10 is a partial section view of the rotor blade of FIG. 3 taken along line A-A in FIG. 3 according to some embodiments of the disclosure.

Some embodiments of the suction side tip rail 70 may be structurally reinforced, in particular in sections of the suction side tip rail 70 between slots 72. For example, as illustrated in FIG. 10, the suction side tip rail 70 may define a thickness 82 along a direction perpendicular to the radial extent 67 of the tip cavity 66. The suction side tip rail 70 may be thickened near the bottom, particularly in sections of the suction side tip rail 70 between slots 72. For example, the aft portion 74 of the suction side tip rail 70 may be thickest at the bottom, e.g., may have a maximum thickness proximate to the tip floor 62 with the thickness 82 decreasing over the radial extent 67 of the tip cavity 66.

Figure 11:
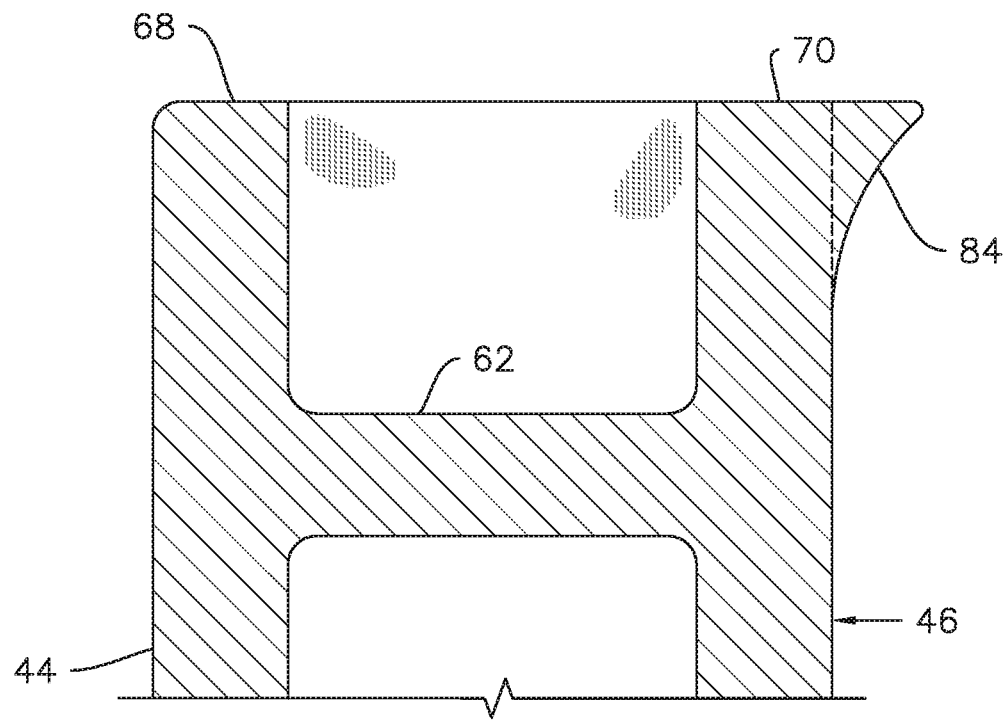
FIG. 11 is a partial section view of the rotor blade of FIG. 3 taken along line A-A in FIG. 3 according to some embodiments of the disclosure.

In some embodiments, the suction side tip rail 70 may include a flare 84, as illustrated in FIG. 11. Accordingly, embodiments of the present disclosure are equally applicable to a flared or un-flared suction side tip rail 70. For example, various combinations and configurations of the one or more slots 72 and the opening 78 may be provided in either a flared or un-flared suction side tip rail 70. The structure and function of the flare 84 is generally understood in the art and not discussed further herein.

Figure 12:
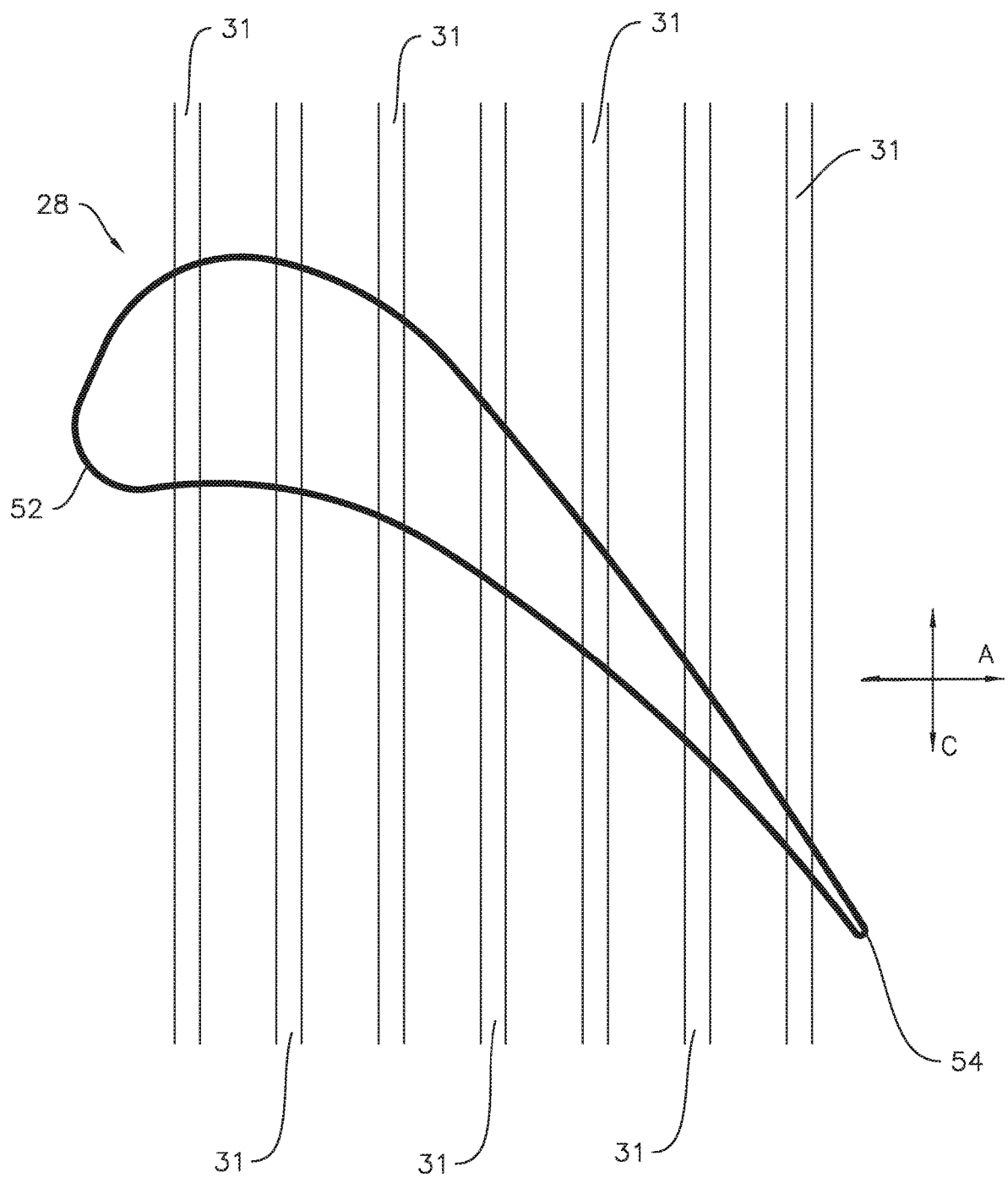
FIG. 12 is a radially inward view of a shroud and an airfoil according to one or more embodiments of the disclosure.

In addition to (or instead of) the slots 72 and opening 78 in the rotor blade 28, vortex-cancelling features may also be provided in the shroud 29. For example, as illustrated in FIG. 12, a series of generally parallel grooves 31 may be provided in the shroud 29. The grooves 31 may extend generally (e.g., within ten degrees of) along the circumferential direction C. The grooves 31 may be continuous along the circumferential extent of the shroud 29. For example, the shroud 29 may be formed from a series of shroud blocks connected together, such as with tongue and groove joints. In such examples, the grooves 31 may be continuous along each block of the multiple shroud blocks forming the shroud 29 such that the grooves 31 each form a complete circle extending fully around the casing 30.

As may be seen generally in FIGS. 13 through 29, the grooves 31 and the tip of the rotor blade 28 define a fluid path between the blade 28 and the adjacent shroud 29. For example, the fluid path may be unobstructed to provide advantageous vortex-cancelling cross flow of fluid, e.g., combustion gases, at the suction side of the airfoil. The fluid path may be unobstructed in that no structure projects radially outward from the tip rail of the rotor blade 28 towards the shroud 29 and/or no structure projects radially inward from the shroud 29, e.g., beyond the radially inner surface 33 thereof, towards the rotor blade 28. FIGS. 13 through 29 illustrate various example embodiments of the rotor blade 28 and shroud 29, which may be provided in any of the illustrated combinations to form a vortex-cancellation system. One of ordinary skill in the art will recognize, however, that the system is not limited to the specific combinations illustrated and that various other combinations are possible. For example, rounded grooves 31 such as those illustrated in any one or more of FIGS. 16 through 18 may also be provided in combination with a rotor blade having one or more slots 72 and an opening 78, e.g., as illustrated in any of FIG. 13 or 26 through 29.

Figure 13:
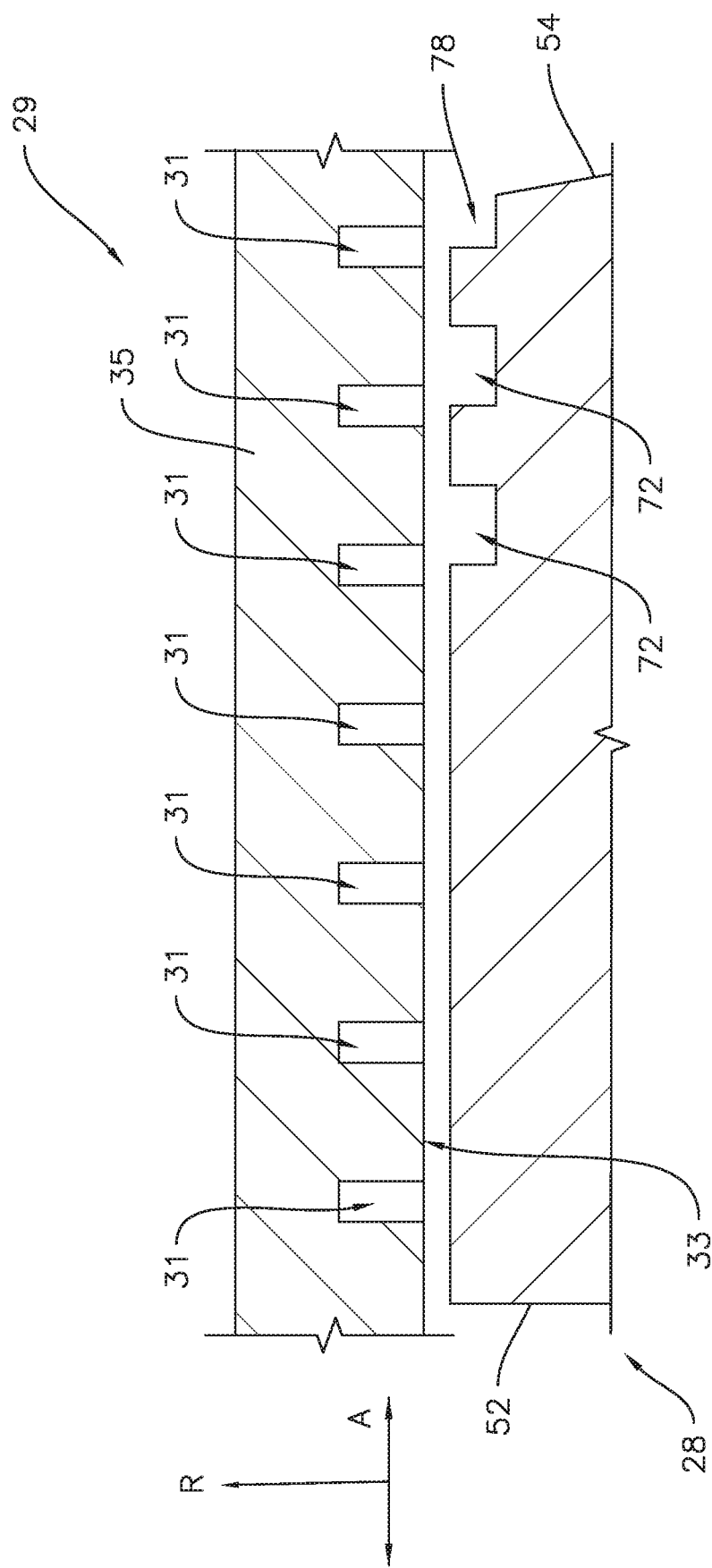
FIG. 13 is a side sectional view of a portion of a shroud and airfoil according to one or more embodiments of the disclosure.

In some embodiments, e.g., as illustrated in FIG. 13, the shroud 29 may include a radially inner surface 33 facing the rotor blade 28, e.g., the tip rails 68 and 70 thereof (e.g., FIGS. 4-11). The radially inner surface 33 may be spaced from the tip rails 68 and 70 such that a clearance gap, which may be unobstructed as described above, is defined between the rotor blade 28 and the shroud 29. The grooves 31 may extend from the radially inner surface 33 of the shroud 29 into a main body 35 of the shroud 29. As shown in FIG. 13, the grooves 31 may have a rectangular cross-section and may be generally evenly spaced along the axial direction A, e.g., between the leading edge 52 and the trailing edge 54. Also illustrated for example in FIG. 13, such embodiments of the shroud 29 may also be provided in a system with a rotor blade 28 having slots 72 and an opening 78, e.g., according to one or more of the embodiments described above.

Figure 14:
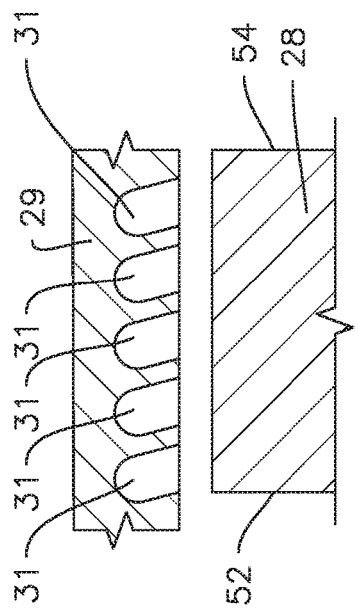
FIG. 14 is a side sectional view of a portion of a shroud and airfoil according to one or more embodiments of the disclosure.

FIG. 13 illustrates oblong rectangular grooves 31, e.g., rectangular grooves having a larger radial extent and a smaller axial extent. In other embodiments, for example as illustrated in FIG. 14, the grooves 31 may comprise an equilateral rectangular, e.g., square, shape.

Figure 15:
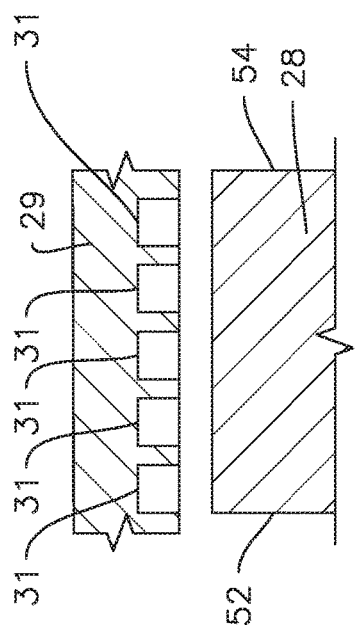
FIG. 15 is a side sectional view of a portion of a shroud and airfoil according to one or more embodiments of the disclosure.

Various additional cross-sectional shapes are also possible for the grooves 31. For example, as illustrated in FIG. 15, the grooves 31 may be asymmetrical, e.g., triangular. As shown in FIG. 15, the grooves 31 may increase in size along the axial direction A, e.g., from the leading edge 52 of the rotor blade 28 towards the trailing edge 54 of the rotor blade 28.

Figure 17:
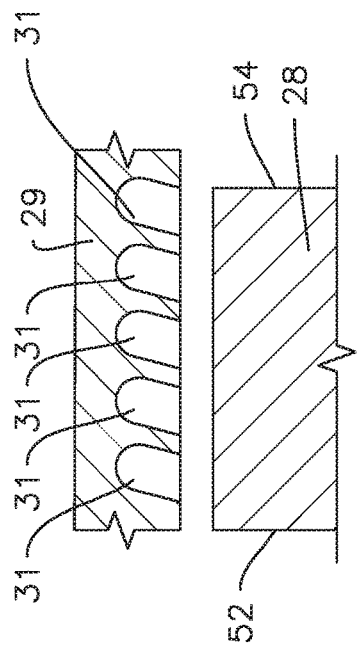
FIG. 17 is a side sectional view of a portion of a shroud and airfoil according to one or more embodiments of the disclosure.
Figure 16:
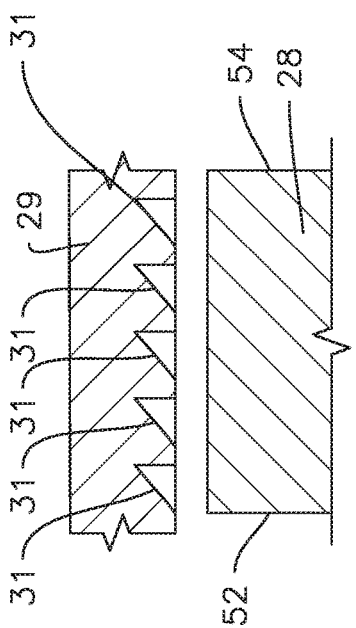
FIG. 16 is a side sectional view of a portion of a shroud and airfoil according to one or more embodiments of the disclosure.
Figure 18:
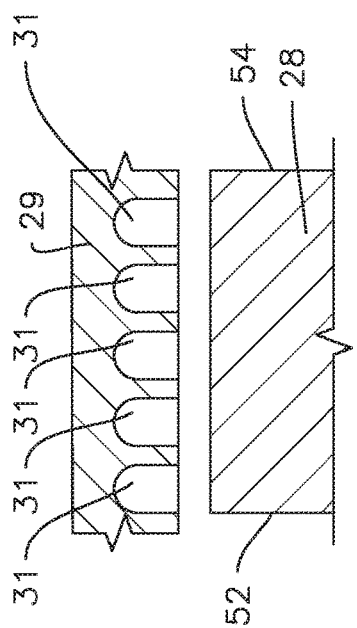
FIG. 18 is a side sectional view of a portion of a shroud and airfoil according to one or more embodiments of the disclosure.

As illustrated for example in FIGS. 16 through 18, in some embodiments the grooves 31 may include at least one arcuate or curved portion. The grooves 31 may be oriented generally along the radial direction R, e.g., as illustrated in FIG. 16. The grooves 31 may be oblique to the radial direction R, e.g., as illustrated in FIGS. 17 and 18. For example, the grooves 31 may be inclined forward, e.g., towards the leading edge 52 of the rotor blade 28, as illustrated in FIG. 17. In another example, the grooves 31 may be inclined aftward, e.g., towards the trailing edge 54 of the rotor blade 28, as illustrated in FIG. 18.

Figure 19:
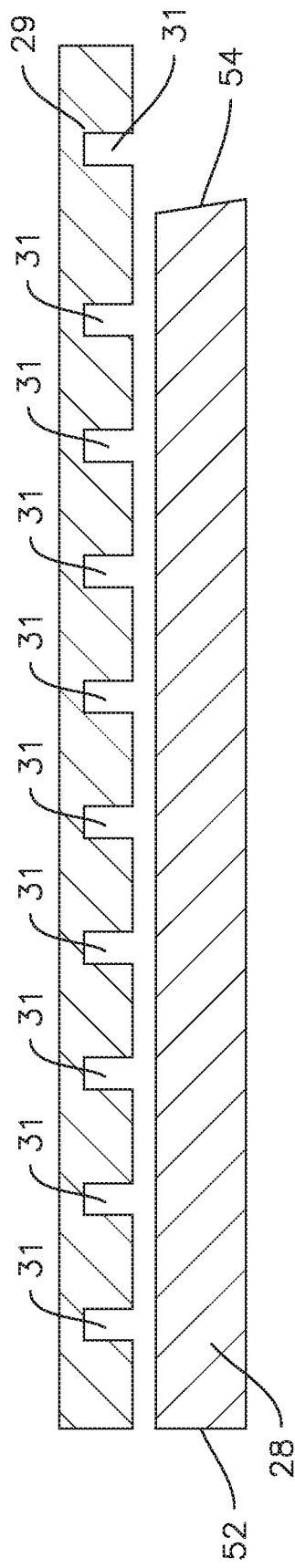
FIG. 19 is a side sectional view of a portion of a shroud and airfoil according to one or more embodiments of the disclosure.

As illustrated for example in FIG. 19, in some embodiments the shroud 29 with grooves 31 therein may be combined with a rotor blade 28 having a solid tip or solid tip rails 68 and 70, e.g., in some embodiments, the rotor blade 28 may not include the slots 72 or the opening 78. In other embodiments, the rotor blade 28 may include the slots 72, according to any one or more of the embodiments shown and described herein, but not the opening 78, or may include the opening 78 but not the slots 72.

Figure 20:
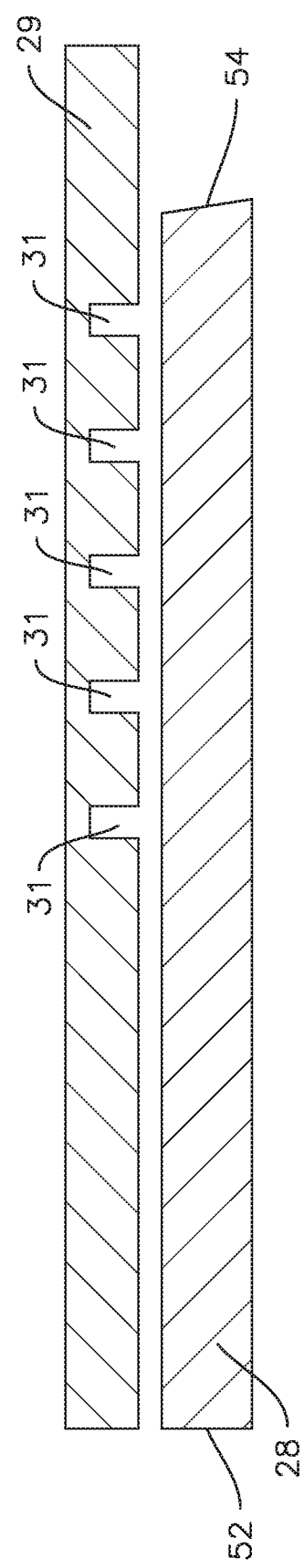
FIG. 20 is a side sectional view of a portion of a shroud and airfoil according to one or more embodiments of the disclosure.
Figure 21:
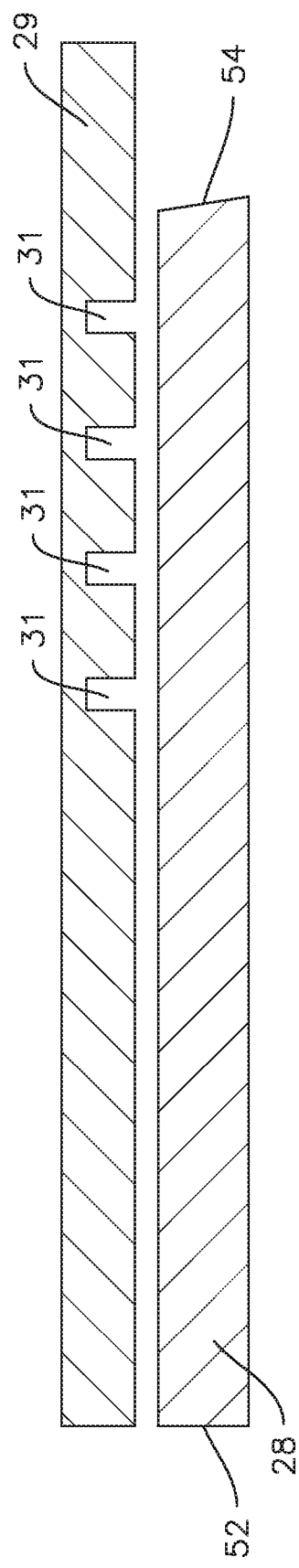
FIG. 21 is a side sectional view of a portion of a shroud and airfoil according to one or more embodiments of the disclosure.
Figure 22:
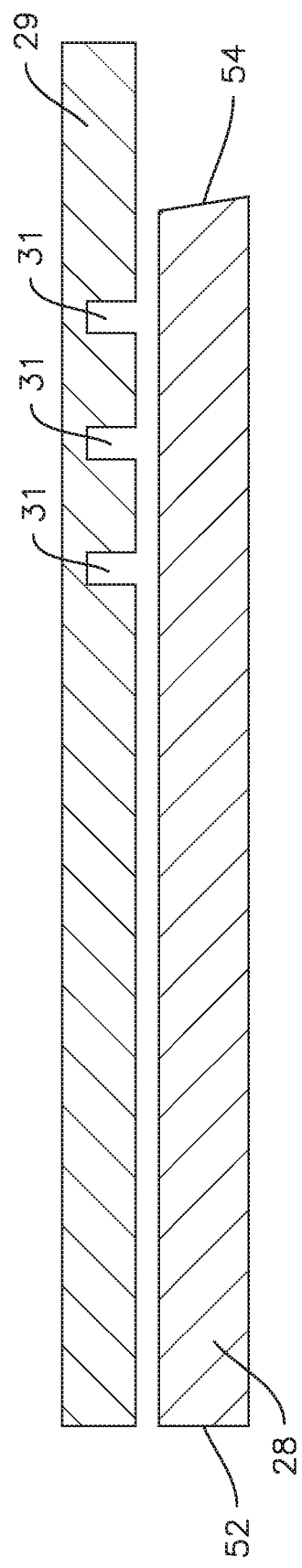
FIG. 22 is a side sectional view of a portion of a shroud and airfoil according to one or more embodiments of the disclosure.
Figure 23:
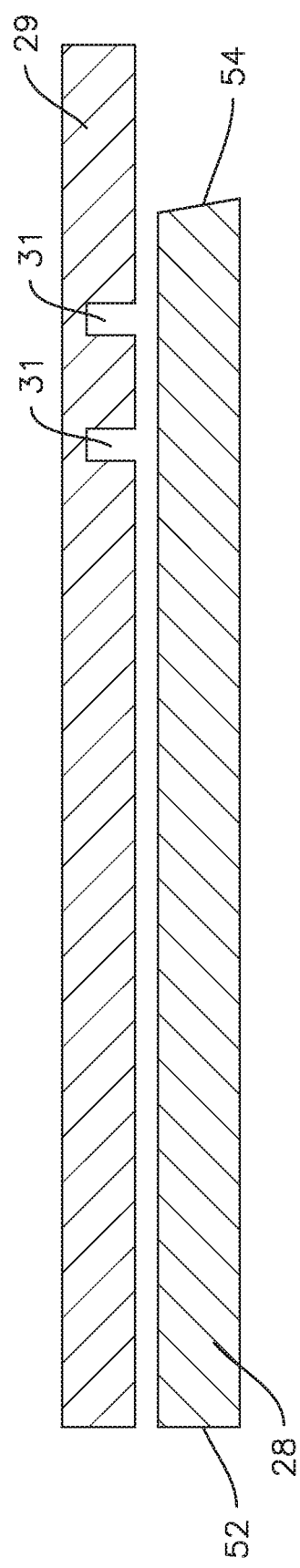
FIG. 23 is a side sectional view of a portion of a shroud and airfoil according to one or more embodiments of the disclosure.
Figure 24:
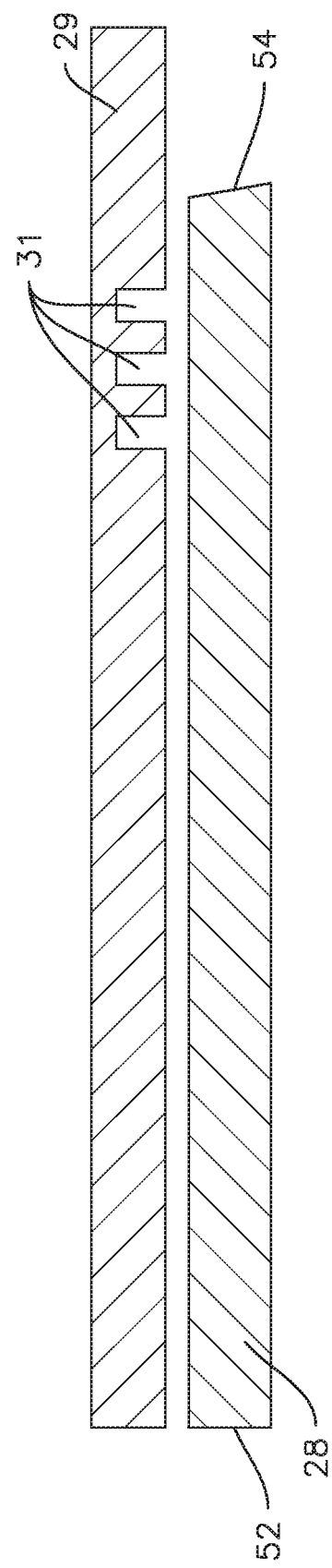
FIG. 24 is a side sectional view of a portion of a shroud and airfoil according to one or more embodiments of the disclosure.
Figure 27:
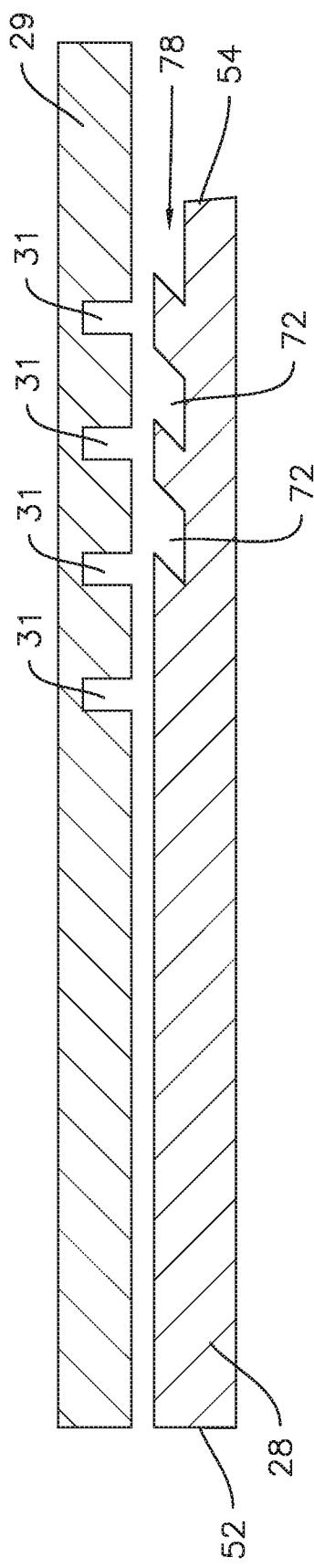
FIG. 27 is a side sectional view of a portion of a shroud and airfoil according to one or more embodiments of the disclosure.

As shown in FIGS. 20, 21, 22, 23, and 24, the grooves 31 may be irregularly spaced along the axial direction A. For example, the grooves 31 may be more closely spaced proximate the trailing edge 54 of the rotor blade 28 and farther apart proximate the leading edge 52 of the rotor blade 28. Such embodiments may include rectangular grooves 31, as illustrated, or may include grooves 31 having any suitable shape, such as those shown in FIGS. 14 through 18 and described above. Further, in various embodiments, any suitable number of grooves 31 may correspond with an associated rotor blade 28. For example, as illustrated in FIGS. 20 and 21, four grooves 31 may be provided proximate the rotor blade 28, including grooves 31 proximate both the aft portion 74 (FIG. 4) and the forward portion 76 (FIG. 4). As shown in FIGS. 22 and 24, three grooves 31 may be provided proximate the rotor blade 28, including in various embodiments, grooves 31 proximate both the aft portion 74 and the forward portion 76, or only proximate the aft portion 74. In another example, some embodiments may include two grooves 31, e.g., as illustrated in FIG. 23. Such embodiments may include grooves 31 only proximate the aft portion 74, as illustrated in FIG. 23, or may include grooves 31 proximate both the aft portion 74 and the forward portion 76.

Figure 28:
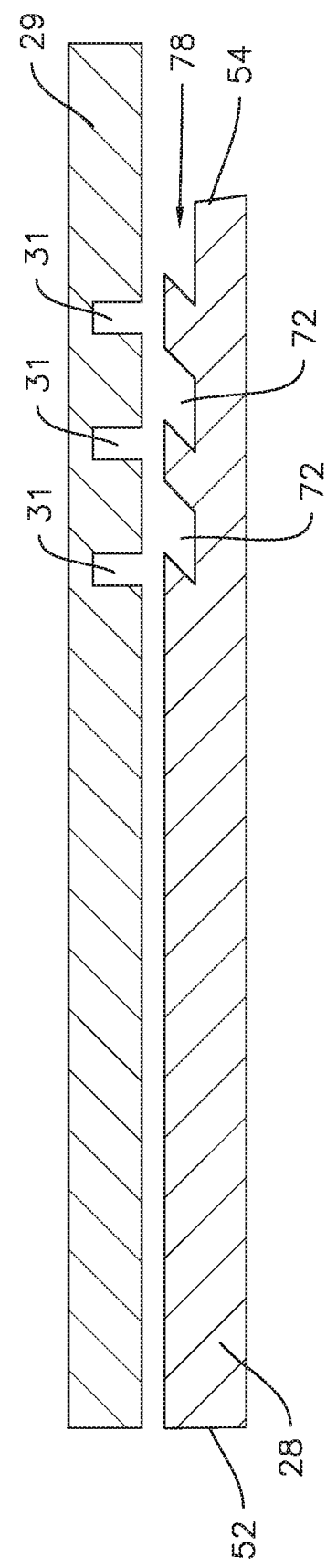
FIG. 28 is a side sectional view of a portion of a shroud and airfoil according to one or more embodiments of the disclosure.
Figure 29:
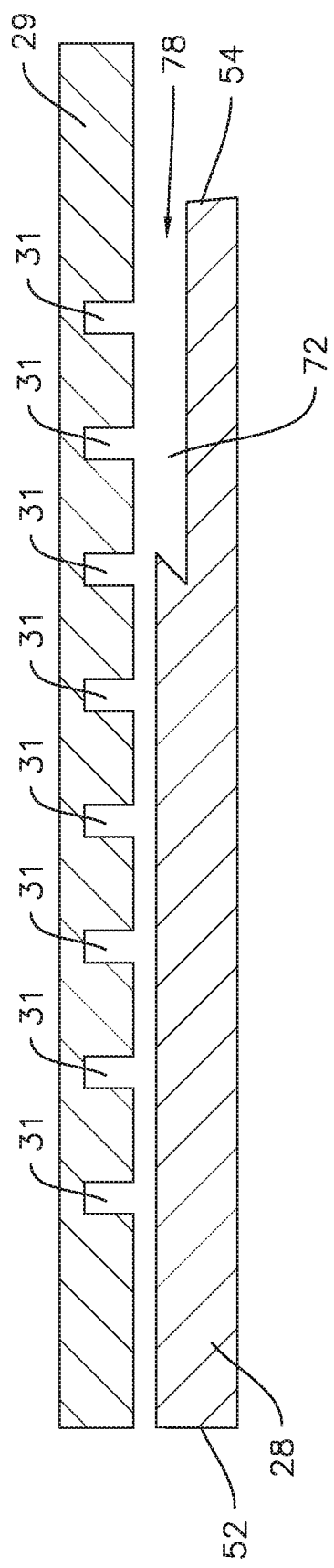
FIG. 29 is a side sectional view of a portion of a shroud and airfoil according to one or more embodiments of the disclosure.

As shown in FIGS. 25, 26, 27, 28, and 29, the shroud 29 having grooves 31 may be combined with a rotor blade 28 including slots 72 and an opening 78. For example, as shown in FIGS. 25 through 28, the shroud 29 having grooves 31 may be combined with a rotor blade 28 having multiple slots 72 which are distinct from the opening 78. As another example, the shroud 29 having grooves 31, e.g., as illustrated in FIG. 29, may be combined with a rotor blade 28 having a slot 72 which is contiguous with the opening 78, such as the rotor blade 28 illustrated in FIGS. 6 and/or 8. In various embodiments, the vortex cancellation system may include the rotor blade 28 having slots 72 and/or opening 78 combined with the shroud 29 having various shapes and arrangements of grooves 31. For example, as illustrated in FIG. 25, such embodiments may include grooves 31 evenly spaced along the axial direction A, e.g., between the leading edge 52 and the trailing edge 54. In some embodiments, a first groove 31, e.g., proximate the leading edge 52, may be omitted, such as in the example embodiment illustrated in FIG. 26. As another example, four regularly spaced grooves 31 may be provided, such as those illustrated in FIG. 27, where grooves 31 are not provided proximate the leading edge 52, e.g., a first two grooves 31 are omitted, and the regularly spaced grooves 31 are concentrated at or near the aft portion 74 (FIG. 4) of the rotor blade 28. In yet another example, as illustrated in FIG. 28, the regularly spaced grooves 31 may be provided only proximate the aft portion 74 of the rotor blade 28. In other embodiments, a shroud 29 having grooves 31 which are irregularly spaced along the axial direction A, e.g., as shown in FIGS. 19 through 24, may be combined with the rotor blade of FIGS. 25 through 29. Additionally, any of the alignments or spacings of the grooves 31 in the shroud 29 that are illustrated in FIGS. 20 through 28 may be provided in combination with the rotor blade 28 of FIG. 29. Numerous other combinations of the various disclosed embodiments of the rotor blade 28 and the shroud 29 are possible, as will be apparent to those of ordinary skill in the art.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for a turbomachine, the turbomachine comprising a casing, the system comprising:
   a rotor blade configured to rotate along a circumferential direction within the casing, the rotor blade comprising:
      a leading edge;
      a trailing edge downstream of the leading edge;
      a root extending between the leading edge and the trailing edge;
      a tip spaced radially outward from the root, the tip including a tip floor;
      a pressure side wall extending between the root and the tip and extending between the leading edge and the trailing edge;
      a suction side wall extending between the root and the tip and extending between the leading edge and the trailing edge, the suction side wall opposing the pressure side wall;
      a pressure side tip rail that extends outwardly along a radial direction from the tip floor between the leading edge and the trailing edge along the pressure side wall;
      a suction side tip rail that extends outwardly along the radial direction from the tip floor between the leading edge and the trailing edge along the suction side wall;
      a tip cavity defined by the tip floor, the pressure side tip rail and the suction side tip rail, the tip cavity defining a radial extent outward of the tip floor; and
   a shroud positioned outward of the rotor blade along the radial direction, a radially inner surface of the shroud facing the pressure side tip rail and the suction side tip rail of the rotor blade and spaced from the pressure side tip rail and the suction side tip rail of the rotor blade by a clearance gap, the shroud comprising a plurality of grooves extending continuously along the circumferential direction, the plurality of grooves extending from the radially inner surface of the shroud into a main body of the shroud;
   wherein the clearance gap and the plurality of grooves define an unobstructed fluid path, wherein gas flows from the tip cavity via the unobstructed fluid path, and the gas flow from the tip cavity inhibits formation of a vortex flow proximate to the suction side wall.

2. The system of claim 1, wherein the plurality of grooves of the shroud are evenly spaced along an axial direction proximate an aft portion of the rotor blade.

3. The system of claim 2, wherein the rotor blade comprises a slot formed in the suction side tip rail at the aft portion of the rotor blade.

4. The system of claim 1, wherein the plurality of grooves of the shroud are evenly spaced along an axial direction between the leading edge and the trailing edge of the rotor blade.

5. The system of claim 1, wherein each groove of the plurality of grooves of the shroud comprises a rectangular cross-section.

6. The system of claim 1, wherein each groove of the plurality of grooves of the shroud comprises an asymmetrical cross-section increasing in size along an axial direction from the leading edge of the rotor blade towards the trailing edge of the rotor blade.

7. The system of claim 1, wherein each groove of the plurality of grooves of the shroud comprises a curved portion.

8. The system of claim 1, wherein the plurality of grooves extend from the radially inner surface of the shroud along the radial direction.

9. The system of claim 1, wherein the plurality of grooves extend from the radially inner surface of the shroud oblique to the radial direction.

10. The system of claim 1, wherein the rotor blade comprises an opening between the suction side tip rail and the pressure side tip rail at the trailing edge.

11. A gas turbine, comprising;
a compressor;
a combustor disposed downstream from the compressor;
a turbine disposed downstream from the combustor, the turbine including a rotor shaft extending along an axial direction through the turbine, a casing extending along a circumferential direction and surrounding the rotor shaft, a plurality of rotor blades interconnected to the rotor shaft and extending along a radial direction from the rotor shaft, the plurality of rotor blades defining a stage of rotor blades, and a shroud connected to the casing between the casing and the plurality of rotor blades, wherein each rotor blade comprises;
  a mounting portion including a mounting body, the mounting body being interconnectable with the rotor shaft; and
  an airfoil coupled to the mounting portion, the airfoil comprising:
    a leading edge;
    a trailing edge downstream of the leading edge;
    a root extending between the leading edge and the trailing edge;
    a tip spaced radially outward from the root, the tip including a tip floor;
    a pressure side wall extending between the root and the tip and extending between the leading edge and the trailing edge;
    a suction side wall extending between the root and the tip and extending between the leading edge and the trailing edge, the suction side wall opposing the pressure side wall;
    a pressure side tip rail that extends radially outwardly from the tip floor between the leading edge and the trailing edge along the pressure side wall;
    a suction side tip rail that extends radially outwardly from the tip floor between the leading edge and the trailing edge along the suction side wall;
    a tip cavity defined by the tip floor, the pressure side tip rail and the suction side tip rail, the tip cavity defining a radial extent outward of the tip floor;
  wherein the shroud comprises a radially inner surface facing the pressure side tip rail and the suction side tip rail of the rotor blade and spaced from the pressure side tip rail and the suction side tip rail of the rotor blade by a clearance gap, the shroud comprising a plurality of grooves extending continuously along the circumferential direction, the plurality of grooves extending from the radially inner surface of the shroud into a main body of the shroud; and
  wherein the clearance gap and the plurality of grooves define an unobstructed fluid path, wherein gas flows from the tip cavity via the unobstructed fluid path, and the gas flow from the tip cavity inhibits formation of a vortex flow proximate to the suction side wall.

12. The gas turbine of claim 11, wherein the plurality of grooves of the shroud are evenly spaced along the axial direction proximate an aft portion of the rotor blade.

13. The gas turbine of claim 12, wherein the rotor blade comprises a slot formed in the suction side tip rail at the aft portion of the rotor blade.

14. The gas turbine of claim 11, wherein each groove of the plurality of grooves of the shroud comprises a rectangular cross-section.

15. The gas turbine of claim 11, wherein each groove of the plurality of grooves of the shroud comprises an asymmetrical cross-section increasing in size along the axial direction from the leading edge of the airfoil towards the trailing edge of the airfoil.

16. The gas turbine of claim 11, wherein each groove of the plurality of grooves of the shroud comprises a curved portion.

17. The gas turbine of claim 11, wherein the plurality of grooves extend from the radially inner surface of the shroud along the radial direction.

18. The gas turbine of claim 11, wherein the plurality of grooves extend from the radially inner surface of the shroud oblique to the radial direction.

* * * * *